Patented Sept. 4, 1945

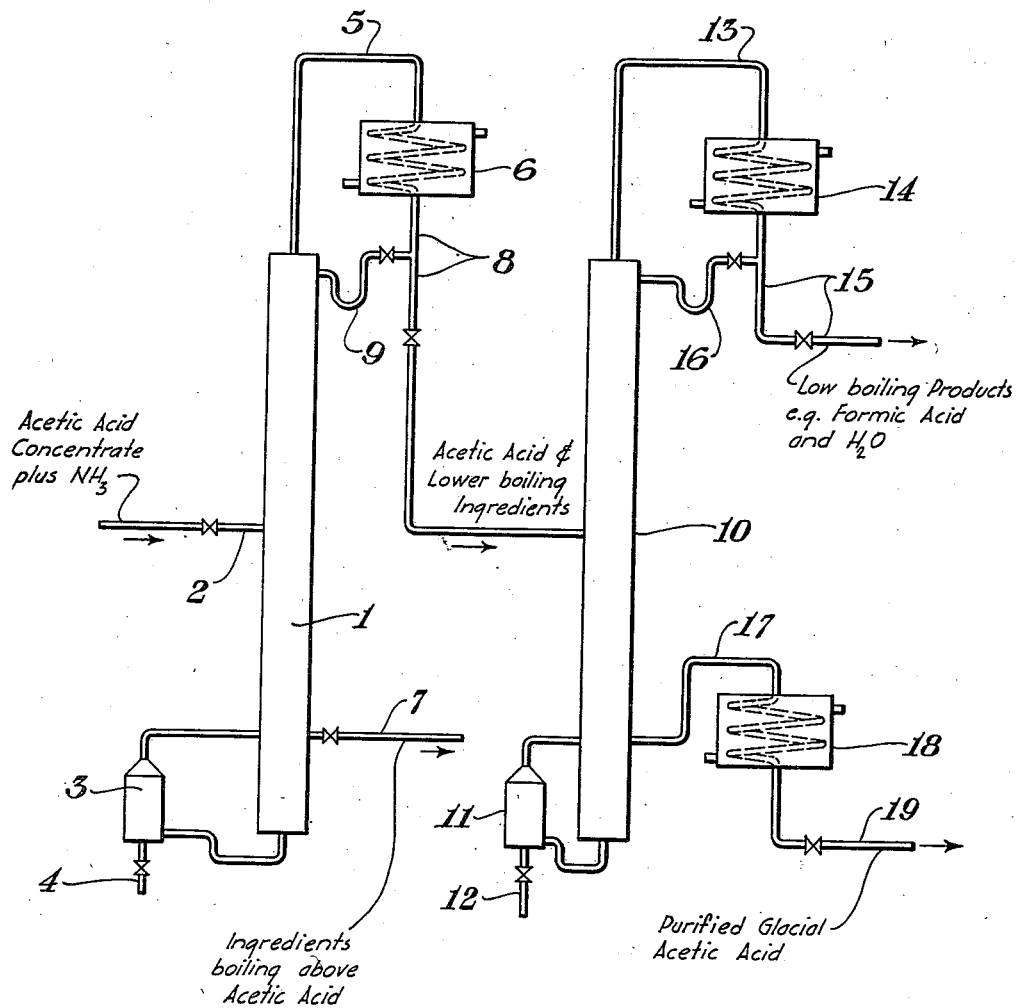

2,384,374

UNITED STATES PATENT OFFICE 2,384,374

RECOVERY OF ACETIC ACID IN PURIFIED FORM

Robert R. Harrison, Marquette, Mich., assignor to Cliffs-Dow Chemical Company, Marquette, Mich., a corporation of Michigan Application May 1, 1942, Serial No. 441,288

8 Claims. (Cl. 202—57)

This invention concerns an improved continuous or semi-continuous method for separating acetic acid in purified glacial form from pyroligneous acid or a fraction thereof.

In recovering acetic acid from the distillate obtained by the destructive distillation of wood, insoluble tarry matter is usually first removed, after which the material is "demethanolized," i. e. ingredients such methanol, acetone, etc., which boil at lower temperatures than water in the presence of water are distilled off. The remaining mixture is heated to distill a mixture of the volatile ingredients therefrom. The distillate is treated in any of a variety of ways to separate water from its organic ingredients, e. g. the organic ingredients are extracted from the distillate with a water-immiscible solvent or water is distilled from the distillate together with a withdrawing agent such as ethylene chloride, propylene chloride or benzene, etc., which is capable of forming a low boiling azeotrope with the water. Usually a further quantity of high boiling and tarry organic ingredients are removed by distilling the volatile organic ingredients therefrom. This latter distillate contains acetic and other aliphatic carboxylic acids in high concentration but is not necessarily entirely anhydrous, i. e. it may contain as much as 5 to 10 per cent by weight of water, although it usually is more nearly anhydrous. Its content of aliphatic carboxylic acids, when calculated as acetic acid, corresponds to at least 80 per cent and usually more than 95 per cent of the combined weight of the organic ingredients. Although the principal ingredient is acetic acid, the material is an extremely complex mixture containing minor amounts of a variety of other substances such as formic acid, propionic acid, butyric acid, diethyl ketone, diacetyl, glyoxal, crotonaldehyde, phenol and other phenolic compounds, high boiling water-soluble ingredients, etc. Such concentrate of the more volatile acidic ingredients, which is an intermediate product obtained as above described or by various modifications of the foregoing procedure in a number of different methods for the recovery of acetic acid from pyroligneous acid, is hereinafter referred to as the "acetic acid concentrate."

The acid ingredients of the acetic acid concentrate are usually separated by fractionally distilling them from the concentrate in the order of their increasing boiling points, i. e. the acetic acid concentrate is carefully rectified to obtain formic acid as the first acid fraction, acetic acid as the second acid fraction, etc. Although acetic acid of very high concentration may be obtained by this procedure, the product usually is not strictly anhydrous and it possesses a pronounced off-odor, a dark color and a freezing point appreciably lower than that of the pure compound.

In U. S. Patent No. 2,126,611 it is disclosed that the impurities which cause discoloration of the acetic acid product may be converted into higher boiling compounds by heating the acid in impure or partially purified form, e. g. in the form of the acetic acid concentrate, with a basic nitrogen compound containing at least two hydrogen atoms attached to the nitrogen, or a salt of such compound, and that the reaction involved may be catalyzed by the presence of copper or a copper compound. Following such treatment it is shown that the acetic acid-containing material may be fractionally distilled to recover the acetic acid in colorless form.

Although the decolorizing procedure of this patent, 2,126,611, has been carried out with complete success in the laboratory and is advantageous when applied as an extra step in recovering acetic acid from pyroligneous acid on a commercial scale by the usual dehydration and rectification method described above, a considerable portion, e. g. 30 to 40 per cent, of the recovered acetic acid obtained by such modified commercial method possesses an off-odor and a discernible color foreign to pure acetic acid, has a freezing point appreciably lower than that of the pure acid, and has the property foreign to the pure acid of rapidly decolorizing potassium permanganate when a trace of the latter is added thereto. From these results it appeared that during fractional distillation of the ammonia-treated acetic acid concentrate on a commercial scale certain of the more complex ingredients gradually decompose with formation of formic acid and impurities which tend to distill together with acetic acid and to discolor the latter and that, in order to recover the purified acid in high yield, repeated treatments of the acetic acid and/or acetic acid-containing material with ammonia or other basic nitrogen compound and repeated distillations of the acetic acid subsequent to such treatments with the basic nitrogen compound would be required. It may be mentioned that the poorer results obtained when acetic acid concentrate was treated with ammonia and thereafter fractionally distilled in the usual manner on a commercial scale are not inconsistent with the excellent results which had earlier been obtained in separating and purifying acetic acid by such procedure on a smaller laboratory scale, since the longer time of heating (e. g. due to the greater inventory of vapors and reflux in the distilling column required for a large scale commercial distillation) would give opportunity for more extensive decomposition of the complex ingredients than would occur in a smaller laboratory distillation.

I have now found that the foregoing difficulties may be avoided and that substantially pure colorless glacial acetic acid may be recovered in excellent yield on a commercial scale from pyroligneous acid or a fraction thereof by treating the hereinbefore described "acetic acid concentrate" with ammonia or other basic nitrogen compound as taught in said U. S. Patent No. 2,126,611, and distilling, provided the order in which the fractions of distillate are collected is changed from that usual in the rectification of the acetic acid concentrate. More specifically, the invention comprises subjecting the treated acetic acid concentrate to at least two successive distillations, at least the first and preferably all of which are carried out in continuous manner and in the first of which distillations a mixture of the acetic acid and formic acid and any lower boiling ingredients is distilled off to leave the higher boiling ingredients, e. g. propionic acid, butyric acid and a considerable part of the decomposable more complex ingredients. The distillate, which is usually discolored, is again fractionally distilled to distill the formic acid and any other ingredients of lower boiling point than acetic acid away from the latter and acetic acid is distilled, usually without fractionation, from the residue and is thereby obtained in highly purified colorless form. Although the last two of these distillations may be carried out separately and in either batch-wise or continuous manner, they are preferably carried out simultaneously in a single continuous distillation operation. This is accomplished by continuously feeding the distillate from the first distillation to the mid-section of a second distillation column while operating the latter so as to fractionally distill the formic acid and other lower boiling ingredients from the acetic acid and withdrawing vapors of the latter from the bottoms to leave a small residue, which is withdrawn. The vapors of acetic acid thus withdrawn are cooled to condense the same, whereby acetic acid of high purity is obtained. The treatment with ammonia or other nitrogen compound is required only prior to or during the first of the above mentioned distillations, although such treatment may also be applied during the subsequent distillations, if desired.

By carrying the rectification out in this manner, the acetic acid is separated from the higher boiling ingredients and at least the major portion of the readily decomposable ingredients before being redistilled to purify the same so that further contamination of the acetic acid due to decomposition of the less stable ingredients is avoided. It will be noted that this distillation procedure for recovering the acetic acid is different from the usual procedure wherein the ingredients of boiling point lower than acetic acid are first removed by distillation, after which the acetic acid is distilled from the residual complex mixture.

The accompanying drawing is a diagrammatic sketch showing an arrangement of distillation equipment which may be employed in practicing the invention and indicating the flow of materials through the apparatus. In the drawing, the numeral 1 designates a usual fractionating column, e. g. a plate column, which is provided near its mid-section with a valved inlet 2 for the material to be distilled. At its lower end the column 1 is provided with a boiler 3 having a valved drain 4. In place of such boiler, a calandria situated inside of the lower end of the column or other usual heating means may, of course, be employed. Toward its lower end the column 1 is also provided with a valved outlet 7 for withdrawing the higher boiling products in continuous manner. A vapor line 5 leads from the top of column 1 to a condenser 6. The latter is connected by a valved line 8 to another distilling column 10. A valved reflux line 9 branches from line 8 and connects with column 1 near its top.

The distilling column 10 is similarly provided at its lower end with a boiler 11 having a valved drain 12 and at its top with a vapor line 13 leading to a condenser 14. The latter is provided with a valved outlet line 15. A valved reflux line 16 branches from line 15 and connects with column 10 near its upper end. Toward its lower end the column 10 is provided with a vapor line 17 which connects with a condenser 18. The line 17 is preferably provided with an upward bend so as to prevent high boiling or non-volatile materials from being swept mechanically therethrough together with the vapors. The condenser 18 is provided with a valved outlet 19.

In recovering and purifying acetic acid by the present method, pyroligneous acid is first demethanolized, freed of tarry ingredients and most of the water, and is distilled to concentrate the more volatile acidic ingredients, which operations may be carried out in any of the usual ways, e. g. in accordance with the procedure hereinbefore described. It may be mentioned that although certain of the lower boiling compounds, e. g. methanol, acetone, etc., are removed during these conventional operations, the acetic acid concentrate thus obtained is not permanently or entirely free of ingredients of lower boiling point than acetic acid, i. e. it includes a small proportion of formic acid and also other ingredients of unknown identity and presumably of more complex molecular structure which are readily decomposed during subsequent heating to form formic acid and/or other substances of lower boiling point than acetic acid. Certain of the ingredients present in the acetic acid concentrate and also certain of the substances formed by such decomposition of the more complex ingredients, which decomposition products include readily oxidizable substances, tend to distill together with and discolor the acetic acid even though the latter be carefully rectified. As hereinbefore mentioned, the acetic acid concentrate also includes a variety of other compounds such as propionic acid, butyric acid and usually phenol and other phenolic compounds, etc.

The acetic acid concentrate is treated with ammonia or other basic nitrogen compound having at least two hydrogen atoms linked with the nitrogen or with a salt of such basic nitrogen compound and a weak acid. Among the various nitrogen compounds which may be employed are ammonia, methylamine, ethylamine, normal- or secondary-butylamine, aniline, toluidine, ammonium acetate, ammonium butyrate, ammonium oxalate, ammonium carbonate, methylamine acetate, etc. When a nitrogen compound other than a salt is used, it is probable that it reacts with the acetic and/or other organic acids in the material under treatment to form such salt, and that the latter serves as the agent for converting the impurities which distill together with and discolor acetic acid into higher boiling substances.

The nitrogen compound, preferably ammonia, is usually employed in amount corresponding to between 0.01 and 0.03 of the molecular equivalent of the acetic acid, but it may be used in smaller or larger proportions. As hereinbefore mentioned, copper and/or copper compounds are effective catalysts for the reaction of the nitrogen compound with the objectionable discoloring ingredients and the mixture is preferably contacted with such catalyst. A mere trace, e. g. 0.1 mole of a copper compound per mole of the nitrogen compound, is sufficient to catalyze the reaction. The catalytic effect may be obtained by adding a copper compound, e. g. copper oxide, copper chloride, or copper acetate, etc., or by carrying out the subsequent distillation in a still lined with or containing metallic copper.

Referring now to the drawing, the mixture of acetic acid concentrate, the nitrogen compound, and the catalyst, when added, is fed in continuous flow through the inlet 2 to the distilling column 1, while operating the boiler 3 so as to distill the acetic acid and lower boiling ingredients, e. g. formic acid, etc., from the higher boiling ingredients of the mixture. During this distillation a portion of the condensate is, of course, returned through line 9 to the column for purpose of reflux. The distillate flows through line 8 to a second distilling column 10. In operating still 1, care is taken to avoid distillation of the propionic acid and higher boiling ingredients together with the acetic acid. By careful operation nearly all of the acetic acid may be distilled in a form substantially free of higher boiling ingredients.

The distillate from column 1 flows through line 8 to column 10, which is operated so as to distill the lower boiling ingredients, e. g. formic acid and water, from the acetic acid, which collects, usually in discolored form, toward the bottom of the column. While continuing the foregoing operations, acetic acid vapors are withdrawn from a lower section of the column through line 17. Alternatively, the acetic acid vapors may, if desired, be withdrawn from the boiler 11 near the base of the column. Usually only a very small amount of higher boiling or non-volatile material remains after withdrawing the acetic acid and this residue may be withdrawn periodically from the lower end of the column or from the boiler, e. g. at intervals of as long as several months. The acetic acid is cooled and condensed during passage through the condenser 18 and flows from the distillation system through the outlet 19. Although the acetic acid in the lower end of column 10 may be discolored, the acetic acid thus withdrawn in vaporized form from the system is usually water white.

By operating as just described, acetic acid may be recovered continuously in a highly purified colorless anhydrous form.

The following experiments, carried out using plant apparatus, differ as regards the mode of fractionating the pretreated pyroligneous acid and as regards the results obtained. Experiment A illustrates operation in accordance with the invention, but is not to be construed as limiting the invention. Experiment B shows the results obtained when the distillation is carried out in the conventional manner, i. e. first to distill off the ingredients which are more volatile than acetic acid and then to distill acetic acid from the residual mixture.

EXPERIMENT A

Acetic acid concentrate which had been prepared by treating pyroligneous acid in known manner to remove most of the water (i. e. the material retained about 1.7 per cent by weight of water), certain of the more volatile ingredients, e. g. methanol and acetone, and the insoluble tarry ingredients was treated in a copper-lined vessel with 0.2 per cent of its weight of gaseous ammonia and the resultant mixture was fed into the mid-section of the column of a still of the type capable of continuous operation. The still was operated so as to distill acetic acid and the more volatile ingredients away from the propionic acid and other ingredients of higher boiling point than acetic acid. The residue was of course withdrawn continuously from a lower section of the still. The distillate, which was discolored, was fed into the mid-section of the column of another still while operating the latter so as to distill the more volatile ingredients, particularly formic acid and water, away from the acetic acid and withdrawing vapors of the latter from a lower section of the column. The acetic acid thus withdrawn was cooled to condense the same. It was water white, had a freezing point of 16.52° C. and analyzed as containing only 0.03 per cent by weight of formic acid. It decolorized potassium permanganate in 105 minutes when tested in accordance with the "permanganate" test described in the U. S. Pharmacopoeia. The yield of this purified acetic acid corresponded to 90.1 per cent of the total weight of the ammonia-treated material which was fed to the first of the abovementioned stills, or about 95 per cent of the acetic acid present in the starting material. The remaining 5 per cent of the initial acetic acid was distributed in the other acid fractions of the rectified mixture, e. g. in the formic acid and the propionic acid fractions, and may be recovered during the purification of these other fractions.

EXPERIMENT B 32,000 pounds of acetic acid concentrate of substantially the same quality as that employed in Experiment A was treated in a copper-lined vessel with 100 pounds of gaseous ammonia. The treated material was fractionally distilled in accordance with conventional distillation procedure to obtain 750 pounds of a fore-fraction containing a minor portion of the acetic acid together with the formic acid and other ingredients of lower boiling point than acetic acid. The next main fraction of distillate was the acetic acid fraction, but this was collected as a series of individual sub-fractions as follows:

*Acetic acid sub-fractions*

| No. | Weight, pounds | Concentration | F. P., °C. | Color |
|---|---|---|---|---|
| 1 | 4,480 | 98% | | Slightly yellow. |
| 2 | 4,600 | Glacial | 15.95 | Colorless. |
| 3 | 4,360 | ----do---- | 16.3 | Slight color. |
| 4 | 4,440 | ----do---- | 16.1 | Do. |
| 5 | 4,440 | ----do---- | 16.15 | Do. |
| 6 | 4,440 | ----do---- | 15.40 | Do. |

After collecting the acetic acid, the distillation was continued to collect propionic acid as the next principal fraction, etc. From the above table it will be seen that only a small portion, i. e. about 17 per cent, of the acetic acid was recovered in colorless form.

Other modes of applying the principle of the invention may be employed instead of those explained, change being made as regards the method herein disclosed, provided the step or steps stated by any of the following claims or the equivalent of said stated step or steps be employed.

I therefore particularly point out and distinctly claim as my invention:

1. In a method for the recovery of substantially pure glacial acetic acid from acetic acid concentrate wherein the latter is treated with a minor amount of a compound selected from the class consisting of basic nitrogen compounds having at least 2 hydrogen atoms linked with the nitrogen and salts of such basic nitrogen compounds and weak acids, the steps which consist in feeding the so-treated material in continuous manner to a fractionating column wherein it is fractionally distilled to cause immediate separation of a mixture of acetic acid and lower-boiling ingredients from the components boiling higher than acetic acid and to obtain such mixture of acetic acid and lower-boiling ingredients as distillate, redistilling the distillate to distill off the ingredients of lower boiling point than acetic acid, vaporizing acetic acid from the residue and condensing the vapors.

2. In a continuous method for the recovery of substantially pure glacial acetic acid from acetic acid concentrate wherein the latter is treated with a minor amount of a compound selected from the class consisting of basic nitrogen compounds having at least 2 hydrogen atoms linked with the nitrogen and salts of such basic nitrogen compounds and weak acids, the steps which consist in feeding the so-treated material in continuous manner to a fractionating column wherein it is fractionally distilled to cause immediate separation of a mixture of acetic acid and lower-boiling ingredients from the components boiling higher than acetic acid and to obtain such mixture of acetic acid and lower-boiling ingredients as distillate while withdrawing from the column the residual materials of boiling points higher than acetic acid, fractionally distilling said lower boiling ingredients from the distillate to leave a residue consisting substantially of acetic acid, and distilling acetic acid from the residue to recover the acetic acid in purified and substantially anhydrous form.

3. In a continuous method for the recovery of acetic acid from acetic acid concentrate, wherein the latter is treated with a small amount of a compound selected from the class consisting of basic nitrogen compounds containing at least 2 hydrogen atoms linked with the nitrogen and salts of such basic nitrogen compounds and weak acids, the steps which consist in feeding the so-treated material in continuous manner to a fractionating column wherein it is fractionally distilled to cause immediate separation of a mixture of acetic acid and lower-boiling ingredients from the components higher boiling than acetic acid and to obtain such mixture of acetic acid and lower-boiling ingredients as distillate while withdrawing from the column the residual substances of higher boiling point than the acetic acid, feeding the distillate from said distillation to a second fractionating column, operating the latter to distill the lower boiling ingredients from the acetic acid and, while continuing said operations, vaporizing acetic acid from the residue, withdrawing the acetic acid vapors from the distilling system and condensing the acetic acid thus withdrawn.

4. In a continuous method for the recovery of substantially pure glacial acetic acid from acetic acid concentrate wherein the latter is treated with a minor amount of ammonia, the steps which consist in feeding the so-treated material in continuous manner to a fractionating column wherein it is fractionally distilled to cause immediate separation of a mixture of acetic acid and lower-boiling ingredients from the substances boiling higher than acetic acid and to obtain such mixture of acetic acid and lower-boiling ingredients as distillate, redistilling the distillate to distill off the ingredients of lower boiling point than acetic acid, vaporizing acetic acid from the residue, and condensing the vapors.

5. In a continuous method for the recovery of substantially pure glacial acetic acid from acetic acid concentrate wherein the latter is treated with a minor amount of ammonia, the steps which consist in feeding the so-treated material in continuous manner to a fractionating column wherein it is fractionally distilled to cause immediate separation of a mixture of acetic acid and lower-boiling ingredients from the substances boiling higher than acetic acid and to obtain such mixture of acetic acid and lower-boiling ingredients as distillate while withdrawing from the column the residual substances of boiling points higher than acetic acid, fractionally distilling said lower boiling ingredients from the distillate to leave a residue consisting substantially of acetic acid, and distilling acetic acid from the residue to recover the acetic acid in purified and substantially anhydrous form.

6. In a continuous method for the recovery of acetic acid in purified form from acetic acid concentrate wherein the latter is treated with a minor amount of ammonia, the steps which consist in feeding the so-treated material in continuous manner to a fractionating column wherein it is fractionally distilled to cause immediate separation of a mixture of acetic acid and lower-boiling ingredients from the substances boiling higher than acetic acid and to obtain such mixture of acetic acid and lower-boiling ingredients as distillate while withdrawing from the column the residual substances of higher boiling point than acetic acid, feeding the distillate from said distillation to a second fractionating column, operating the latter to distill the lower boiling ingredients from the acetic acid, and, while continuing said operations, vaporizing acetic acid from the residue, withdrawing the acetic acid vapors from the distilling system, and condensing the acetic acid thus withdrawn.

7. In a method wherein acetic acid concentrate, comprising formic acid, acetic acid, propionic acid, colored impurities that tend to distill together with acetic acid, and thermally unstable substances of boiling points higher than acetic acid, is treated with a minor amount of a compound selected from the class consisting of basic nitrogen compounds having at least two hydrogen atoms linked with the nitrogen and salts of such basic nitrogen compounds and weak acids, the steps which consist in feeding the so-treated concentrate in continuous manner to a fractionating column wherein it is fractionally distilled to cause immediate separation of a mixture of acetic and formic acids from the propionic acid and other substances of higher boiling points than acetic acid and to obtain such mixture of acetic and formic acids as distillate while withdrawing from the column the residual mixture of propionic acid and other substances boiling higher than acetic acid, feeding the distillate from said distillation to a second column wherein the ingredients of boiling points below that of acetic acid are distilled from the latter, vaporizing acetic acid from the residue, withdrawing the acetic acid vapors from the distilling system, and condensing the acetic acid thus withdrawn.

8. In a method wherein acetic acid concentrate, comprising formic acid, acetic acid, propionic acid, colored impurities that tend to distill together with acetic acid, and thermally unstable substances of boiling points higher than acetic acid, is treated with a minor amount of ammonia, the steps which consist in feeding the so-treated concentrate in continuous manner to a fractionating column wherein it is fractionally distilled to cause immediate separation of a mixture of acetic and formic acids from the propionic acid and other substances higher boiling than acetic acid and to obtain such mixture of acetic and formic acids as distillate while withdrawing from the column the residual mixture of propionic acid and other substances higher boiling than acetic acid, feeding the distillate from said distillation to a second column wherein the ingredients of boiling points below that of acetic acid are distilled from the latter, vaporizing acetic acid from the residue, withdrawing the acetic acid vapors from the distilling system, and condensing the acetic acid thus withdrawn.

ROBERT R. HARRISON.